(12) United States Patent
Doerr et al.

(10) Patent No.: US 7,215,852 B2
(45) Date of Patent: May 8, 2007

(54) METHOD AND APPARATUS FOR MODE CONVERSION

(75) Inventors: Christopher Richard Doerr, Middletown, NJ (US); Lawrence Warren Stulz, Neptune, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 426 days.

(21) Appl. No.: 10/704,389

(22) Filed: Nov. 7, 2003

(65) Prior Publication Data

US 2005/0036526 A1 Feb. 17, 2005

Related U.S. Application Data

(63) Continuation-in-part of application No. 10/641,519, filed on Aug. 15, 2003.

(51) Int. Cl.
G02B 6/26 (2006.01)
G02B 6/42 (2006.01)

(52) U.S. Cl. .......................................... 385/46; 385/39
(58) Field of Classification Search ................ 385/46, 385/39
See application file for complete search history.

(56) References Cited

U.S. PATENT DOCUMENTS

| | | | | |
|---|---|---|---|---|
| 4,571,545 A * | 2/1986 | Griffin et al. | ................ | 324/630 |
| 4,669,086 A * | 5/1987 | Kaede et al. | ................. | 372/32 |
| 4,752,120 A * | 6/1988 | Shimizu | .................... | 359/239 |
| 5,319,659 A * | 6/1994 | Hohimer | ................... | 372/45.01 |
| 5,400,353 A * | 3/1995 | Walpole et al. | .......... | 372/46.01 |
| 5,546,483 A * | 8/1996 | Inoue et al. | ................... | 385/14 |
| 5,828,799 A * | 10/1998 | Donald | ......................... | 385/16 |
| 5,949,573 A * | 9/1999 | Glance | ........................ | 359/326 |
| 6,195,482 B1 * | 2/2001 | Dragone | ...................... | 385/28 |
| 6,339,664 B1 * | 1/2002 | Farjady et al. | ................ | 385/37 |
| 2001/0008539 A1* | 7/2001 | Kudo | ........................... | 372/50 |
| 2002/0150320 A1* | 10/2002 | Kato | ............................ | 385/14 |
| 2002/0172464 A1* | 11/2002 | Delwala | ....................... | 385/40 |

OTHER PUBLICATIONS

"Simultaneous CW Operation Of Shared Angular Dispersive Element WDM Lasers," C.R. Doerr, R. Monnard, C.H. Joyner and L.W. Stulz, published in IEEE Phonotonics Technology Letters, vol. 10, No. 4, Apr. 1998.

* cited by examiner

*Primary Examiner*—Armando Rodriguez
*Assistant Examiner*—Rory Finneren

(57) ABSTRACT

Spot-size conversion for interfacing a first optical element having a higher refractive index to a second optical element having a lower refractive index is achieved through the use of two optical star couplers coupled to each other through a plurality of optical paths embedded in a planar waveguide. The beam from the high refractive index element is introduced into a high numerical aperture (NA) star coupler, which directs the beam through a plurality of optical paths to a second star coupler with a lower numerical aperture than the first star coupler so that its output spot-size is larger. The output port of the second star coupler is interfaced to the lower refractive index element. Wavelength selection can be provided by making non-zero path-length differences between adjacent optical paths between the two star couplers. Wavelength tunability can be provided by including phase shifters in the paths between the two star couplers to alter the effective optical lengths of the paths to selectively produce the desired phase interference pattern at the desired wavelength.

30 Claims, 6 Drawing Sheets

METHOD AND APPARATUS FOR MODE CONVERSION

RELATED APPLICATIONS

This application is a continuation-in-part of U.S. patent application Ser. No. 10/641,519, filed Aug. 15, 2003.

FIELD OF THE INVENTION

The invention pertains to mode conversion between different waveguide devices. More particularly, the invention pertains to mode conversion and frequency tuning of semiconductor lasers.

BACKGROUND OF THE INVENTION

In optical networks and other environments, it often is necessary to interface semiconductor optical amplifiers and other semiconductor optical devices to optical fibers, silica planar optical waveguides, and other optical media. These various optical devices and media often have different propagation modes and thus require mode (or spot-size) conversion in order to interface to each other. For instance, optical seminconductor devices such as a semiconductor optical amplifier (SOA) typically have a very small spot size (or mode) compared to an optical fiber or a silica planar optical waveguide. One application for the coupling of an SOA to a silica planar optical waveguide is the construction of a wavelength tunable laser.

The difference in spot-size often is a result of a difference in the refractive index of the light propagating media of the device. For instance, an optical fiber or silica planar optical waveguide typically has a refractive index of about 1.45 and thus, a relatively large mode (or spot size), whereas a semiconductor laser typically has an optical index of about 3.3 and thus a relatively small mode (or spot size).

Several techniques for mode conversion, therefore, are well known and in common use, such as, the use of lenses or mode converters. The use of lenses to mode convert has several drawbacks, including the expense of the optical components and their precise assembly and the need to hermetically package the interface. Another technique for mode conversion is to fabricate an SOA with a horizontal and vertical taper close to its output facet. However, fabricating a vertical taper in a semiconductor is a complex, time consuming and expensive process and often requires an SOA performance trade-off.

With respect to wavelength tunable lasers, one common type is a distributed Bragg reflector (DBR) laser employing grating-assisted couplers and/or sampled gratings. While these lasers have adequate performance, they require complex InP growth and processing, time-consuming testing and calibration, sensitive control, and an external wavelength monitor. They also typically have a small optical mode, requiring precise alignment in order to couple to optical fibers (tolerance of less than 0.1 microns). While such lasers are relatively inexpensive, the above-noted challenges make the price too high for applications such as fiber-to-the-home.

Another common type of tunable laser is the bulk-optic external cavity laser. These lasers also have adequate performance, but require significant hand assembly and have moving parts.

Another, less common type of tunable laser is an array of fixed-wavelength lasers coupled together with a power combiner. The disadvantages of this approach include complicated processing, limited wavelength tuning, and low output power.

Accordingly, one object of the present invention is to provide an improved tunable laser by coupling a standard SOA to a silica planar optical waveguide using an easily fabricated and packaged mode conversion apparatus.

Spot-size conversion in one dimension can be achieved by providing a horizontal taper near the output facet of the semiconductor optical device and orienting it at a 90° angle to the silica planar waveguide layer. Due to the 90° orientation of the semiconductor optical device to the silica planar waveguide layer, the horizontal taper of the semiconductor optical device can result in a matching of the vertical size component of the modes. To match the horizontal size component of the modes we propose to use a high-numerical aperture star coupler as described below.

SUMMARY OF THE INVENTION

Spot-size conversion for interfacing a first optical element having a higher refractive index, such as a semiconductor optical device, to a second optical element having a lower refractive index, such as an optical fiber, is achieved through the use of two optical star couplers coupled to each other through a plurality of optical waveguides. The star couplers and paths may be embodied in a planar waveguide. To convert spot size in one dimension, the beam from the high refractive index element is introduced into a high numerical aperture (NA) star coupler such that when the horizontally small spot-size beam hits the relatively lower refractive index planar waveguide and starts to diverge rapidly, the multiple ports of the high NA star coupler collect the rapidly diverging light and guide it into the plurality of waveguides. Each of the plurality of waveguides is coupled at its opposite end to a port of the second star coupler. The second star coupler has a lower numerical aperture than the first star coupler so that its output spot-size is larger. The output port of the second star coupler is interfaced to the lower refractive index element. The combination of the two changes in spot-size results in an overall mode of conversion in both the vertical and horizontal directions.

To provide some spot placement adjustment, each waveguide between the two star couplers can be provided with a controllable phase shifter. Movement of the spot laterally is accomplished by applying a linear phase shift distribution across the connecting waveguides, and spot focus is adjusted by applying a parabolic phase shift distribution across the connecting waveguides. If the connecting waveguides have a substantial path-length difference between adjacent waveguides, so as to provide a grating function, one can further provide wavelength tunability, by adjusting the phase shifters. A linear phase shift distribution moves the wavelength comb of the grating, and, if the grating is chirped, a parabolic phase shift distribution can change which grating order has the highest transmissivity.

DETAILED DESCRIPTION OF THE INVENTION

Figure 1:
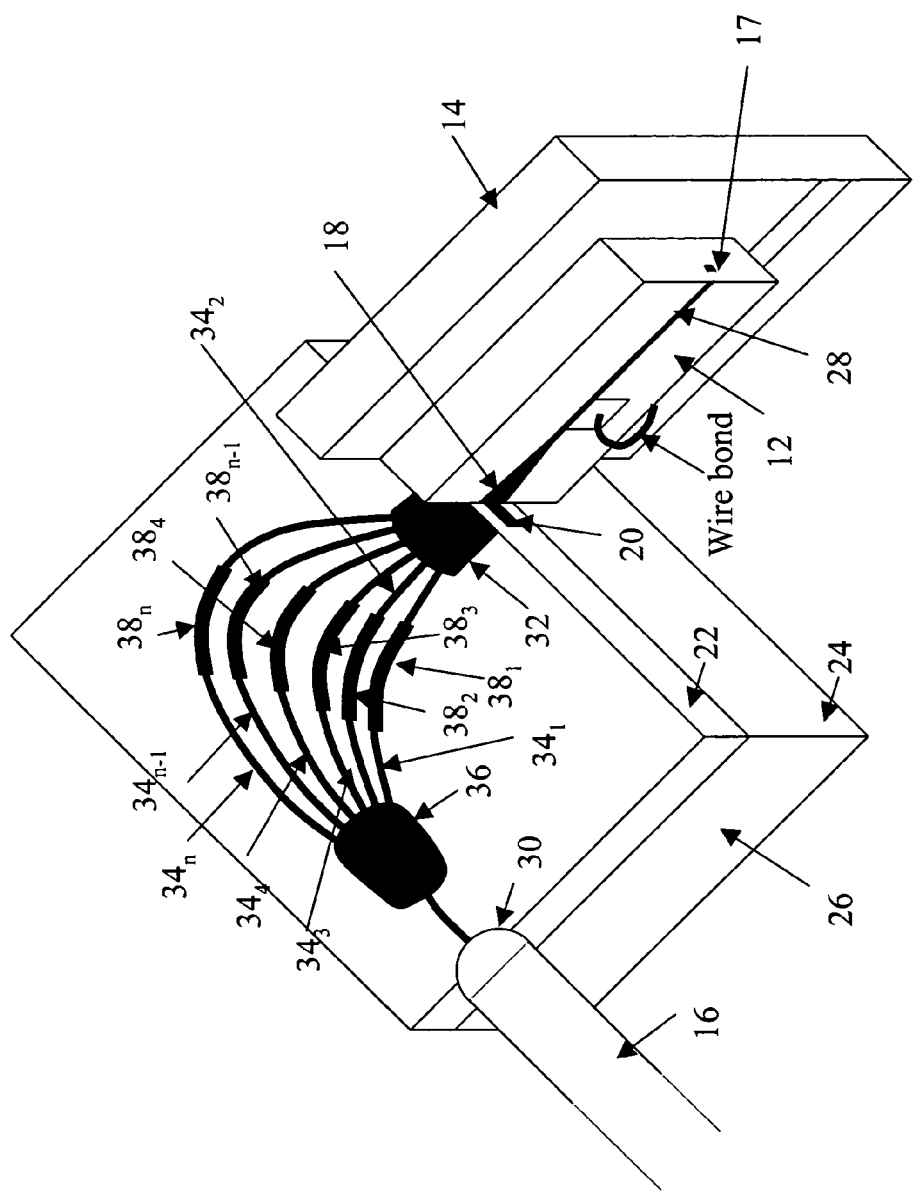
FIG. 1 is a pictorial representation of a tunable laser employing mode conversion in accordance with an embodiment of the present invention.

FIG. 1 illustrates the basic components of a wavelength tunable laser with mode conversion in accordance with a particular embodiment of the present invention. An optical element with a relatively high refractive index, such as a semiconductor optical device, and, more particularly, a semiconductor optical amplifier (SOA) 12 is mounted on a submount 14. The SOA may comprise any form, but in one preferred embodiment is formed in InP waveguides. In the illustrated embodiment, the light output from the SOA 12 is to be coupled to another optical element having a lower refractive index, such as an optical fiber 16. Accordingly, the mode or spot size of the beam in the SOA 12 is smaller than the mode or spot size in the fiber 16. The output media does not necessarily have to comprise an optical fiber, but can take many other forms, including waveguides, silica planar waveguides, another semiconductor, etc. The SOA 12 has an output facet 18 coupled to a facet 20 in a silica waveguide layer 22 of a waveguide structure 24. The silica waveguide layer 22 is disposed on a silica base layer 26. The materials are merely exemplary. In the particular embodiment of FIG. 1, the lasing channel comprises the waveguide 28 of the SOA 12 and the waveguide circuit 24 (as described hereinbelow). Accordingly, facets 18 and 20 are nonreflective (and preferably are coated with an anitireflection coating), but facet 30 in the silica waveguide layer 22 that interfaces with the fiber 16 is partially reflective so as to define the lasing cavity as the cavity between the back end of the SOA 12 and the facet 30 of the silica waveguide layer 22.

The optical pathway in the waveguide structure 24 comprises a first star coupler 32 adjacent facet 20, a plurality of waveguides $34_1$–$34_n$ (also referred to herein as grating arms), and a second star coupler 36. Preferably, the optical length of each grating arm $34_1$–$34_n$ is different. In a preferred embodiment, the physical lengths of the grating arms differ from each other by integer multiples of the wavelength of the light output from SOA 12. Furthermore, the effective optical length of each grating arm $34_1$–$34_n$ is individually adjustable by means of a phase shifter $38_1$–$38_n$ associated with each grating arm. In a preferred embodiment of the invention, the phase shifters $38_1$–$38_n$ are thermo-optic phase shifters. Thermo-optic phase shifters are known in the related arts and comprise a heating element positioned adjacent each grating arm, with each heating element being individually energizable to heat the corresponding grating arm. The temperature variation changes the effective optical length of the path through the grating arm. The thermo-optic phase shifters, therefore, can be used to adjust the effective path lengths in the various grating arms to, in turn, adjust the phase interference between the light in the various grating arms in order to tune the wavelength of the light output to fiber 16.

Two aspects of the design of the present invention provide mode conversion. First, the plane of the SOA is oriented at a 90° angle to the plane of the silica waveguide layer 22. The SOA may be attached to the waveguide in any reasonable fashion, such as by adhesive. The 90° orientation of the SOA 12 to the silica waveguide 22 causes the horizontal aspect of the spot-size at the output facet 18 of the SOA to become the vertical spot-size aspect in the silica waveguide layer 22 and the vertical aspect of the beam spot-size at the output facet 18 of the SOA 12 to be the horizontal aspect of the spot-size in the waveguide layer 22. As such, in accordance with this feature of the invention, the horizontal aspect of the spot-size output from the output facet 18 of the SOA 12 can be made to match the desired vertical aspect of the spot-size for the silica wavelength layer 22 and/or the fiber 16 simply by horizontally tapering the SOA optical channel 28 to the desired horizontal dimension adjacent the output facet 18. More specifically, the channel 28 in the SOA 12 can be horizontally widened so as to provide a vertical aspect of the spot-size equal to the desired vertical aspect for the spot-size in the silica waveguide 22 or fiber 16. Waveguide layers, such as waveguide layer 22, and fiber 16 typically will both be made of the same material and thus have the same mode/spot-size. Hence, the vertical aspect of the spot size in the waveguide layer 22 should be the same spot size desired for the fiber 16.

Providing a horizontal taper to the optical path 28 in the SOA in order to convert one dimension (i.e., aspect) of the spot between the SOA and the fiber/waveguide layer can be achieved easily during fabrication. Essentially, it requires that a single fabrication mask used to create the optical channel be patterned accordingly (whereas vertical tapering of the optical path 28 in the SOA in order to mode match the spot-size in the second dimension would be impractically complex and expensive for most commercial products). Accordingly, by horizontal tapering in the SOA, one aspect of the mode conversion is easily achieved. However, in the horizontal aspect, the output of the SOA still will be very small (typically on the order of six to nine times smaller) than that desired in silica waveguide layer 22 or optical fiber 16.

In accordance with the present invention, the horizontal aspect of the spot-size is converted within the waveguide layer 22 by the appropriate selection and use of the star couplers 32 and 36. Particularly, as is well known in the arts, when a light beam is introduced into a waveguide, such as silica waveguide layer 22, in a mode much smaller than the fundamental mode of the waveguide, significant optical power will be lost. In accordance with the present invention, in order to prevent the rapid dissipation of the beam in the waveguide layer 22, only a small free space region with a high numerical aperture is provided in the silica waveguide layer 22 between the facet 18 and the input ports of the first star coupler 32. (Note that the terms "input" and "output" are merely exemplary in this specification since, as will become clear, light may travel in either direction through the star couplers 32 and 36 and the various facets 18, 20, and 30. In fact, in the preferred embodiment described herein, light travels through star couplers 32 and 36 and facets 18 and 20 in both directions since they are all within the lasing cavity. For purposes of simplifying the discussion herein, parts at the right side of an optical element in FIG. 1 will herein be termed "input" ports and ports at the left side of an optical element will be termed "output" ports for ease of reference.) Thus, the beam is almost immediately collected into a plurality of waveguides arranged in a radial pattern that collects most of the widely dispersing light. This type of radial arrangement of waveguides is known in the related arts as a star coupler and is commonly used to couple one waveguide to many waveguides.

Since the spot size output from the SOA 12 is so small, the star coupler 32 should be a high numerical aperture star coupler 32 and be placed immediately adjacent the facet 20. The "output" ports of star coupler 32 are coupled to the aforementioned grating arms $34_1$–$34_n$. The opposite ends of the grating arms $34_1$–$34_n$ are coupled to the input ports of a second star coupler 36 having a lower numerical aperture than the first star coupler 32. The numerical aperture of the second star coupler 36 is specifically chosen to provide a horizontal aspect of the spot-size at the output port of the second star coupler 36 matched to the mode of the fiber 16 (which, as previously noted, is likely to be the same mode as for the waveguide layer 22 itself).

The output port of the second star coupler 36 is coupled into the fiber 16 through a further waveguide 37 and a partially reflective facet 30. The light at facet 30 is mode matched to the fiber 16 in both its vertical and horizontal aspects. However, waveguide 37 is optional, and the fiber may be directly coupled to star coupler 36.

Facet 30 is partially reflective, because, in a preferred embodiment of the invention as described hereinbelow, the lasing cavity comprises the entire optical path between the back facet 17 of the SOA 12 and the output facet 30 of the silica waveguide. (Particularly, as noted above, the wavelength tuning is provided in the waveguide layer 22.) In other embodiments in which lasing is not desired in the waveguide layer 22 (e.g., a non-tunable laser), then facet 30 may be a non-reflective facet and facet 18 of the SOA should be partially reflective. Even further, in a non-tunable embodiment of the invention, phase shifter $38_1$–$38_n$ are not necessary and may be omitted.

An advantage of the design of the present invention is that no precise alignment of the SOA to the waveguide layer is necessary. Particularly, the vertical aspect of the spot size in the silica waveguide and the corresponding lateral spot size aspect in the SOA at its output facet are large such that small alignment errors will have little or no effect. Further, even though the SOA vertical mode is very small at the interface with the silica waveguide layer any offset between the output facet 18 of the SOA and the input facet 20 of the silica waveguide layer (I.e., lateral offset within the plane of the waveguide layer) will simply result in a wavelength shift, which can be compensated for by the phase shifters. Furthermore, focus error, such as might occur if the SOA is not properly axially aligned to the waveguide layer (e.g., too much air gap between the output facet 18 of the SOA and the input facet 20 of the waveguide layer), also can be compensated for by the phase shifters. More specifically, as discussed in more detail below, the phase shifters can be configured to provide wide wavelength tunability over a plurality of free spectral ranges by applying a parabolic distribution in effective path lengths among the grating arms.

Figure 2:
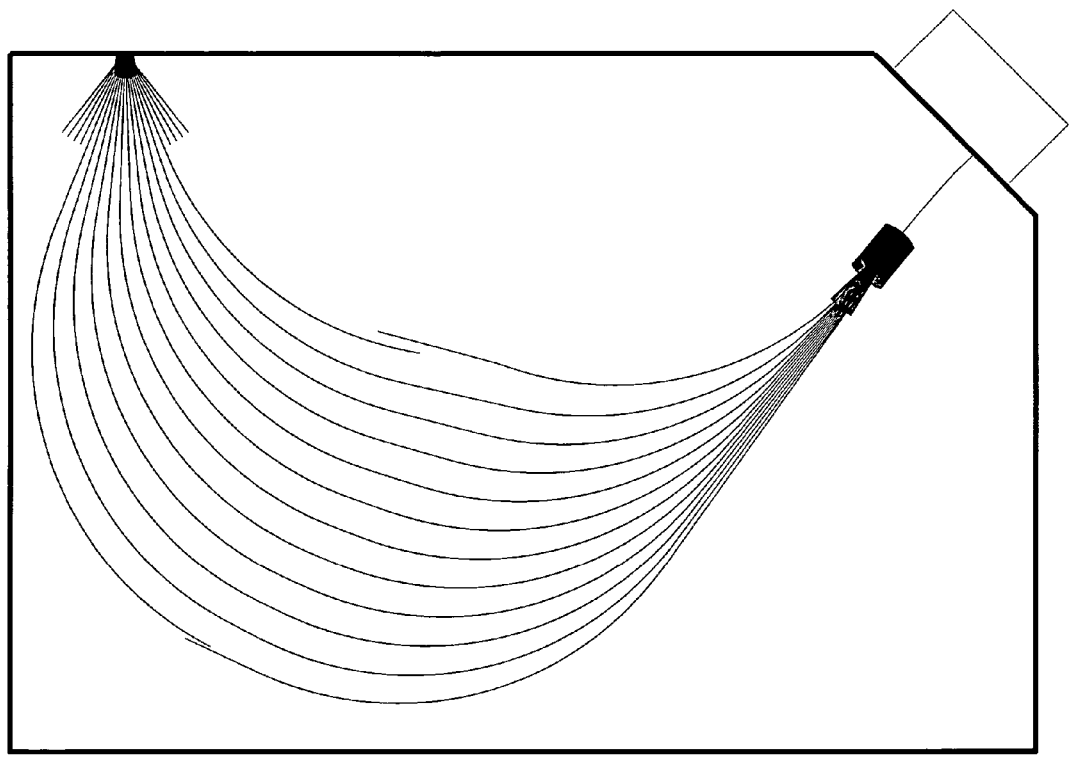
FIG. 2 is a pictorial plan view illustrating relative layout of the star couplers and the waveguides in accordance with an embodiment of the present invention.

FIG. 2 shows a layout for the grating arms $34_1$–$34_n$ in accordance with one preferred embodiment of the invention. Note that the angular spread of the grating arms is greater at the high numerical aperture star coupler 32 than at the lower NA coupler 36.

Also, an extra "dummy" waveguide $33_1$ and $33_2$ is provided to the outside of each of the first and last waveguides $34_1$–$34_n$. The use of the dummy paths $33_1$, $33_2$ to the outside of the first and last grating arms makes the etching more uniform for the actual grating arms. Specifically, fabricating the shortest and longest light paths as dummies helps make the etching of the intermediate paths, i.e., the actual grating arms $34_1$–$34_n$, more uniform. In addition, several more very short dummy paths or dummy ports 35 are provided in each of the star couplers 32 and 36. These dummy paths 35 serve the same purpose as the dummy paths $33_1$, $33_2$. Particularly, they allow for the etching of the actual grating arms to be more uniform. They also make the coupling into and out of the star couplers more uniform.

While a particular embodiment of the invention has been hereinabove described in connection with a system in which light is amplified in SOA 12 and waveguide 24 and output to a fiber 16, it should be understood that the general direction of the light is irrelevant and that the invention described hereinabove also will work if the general direction of the light is in the opposite direction, i.e., light is input to the system from fiber 16 for amplification by the device 10 and output from the facet 17 of SOA 12. Of course, in such an embodiment, facet 17 would be a partially reflective facet and would be coupled to a further optical component. For instance, another waveguide structure similar or identical to waveguide structure 24 might be coupled to the facet 17 of the SOA 12 in order to mode convert before coupling into another fiber similar or identical to fiber 16.

The physical lengths of the waveguides (i.e., ignoring the effect of the phase shifters for the moment) may be selected so as not to be perfectly linear in length distribution, but to have a small amount of nonlinearity so as to help assure that the path lengths cannot add up constructively to more than one wavelength in more than one free spectral range. By properly controlling the phase shifters $38_1$–$38_n$, two types of tuning can be achieved. Particularly, by using the phase shifters to provide a linear distribution in path lengths among the grating arms, the tuned wavelength can be changed within a single free spectral range. However, if it is desired to achieve wider wavelength tunability over a plurality of free spectral ranges, the phase shifters can be configured to apply a parabolic distribution in path lengths among the grating arms.

Figure 3:
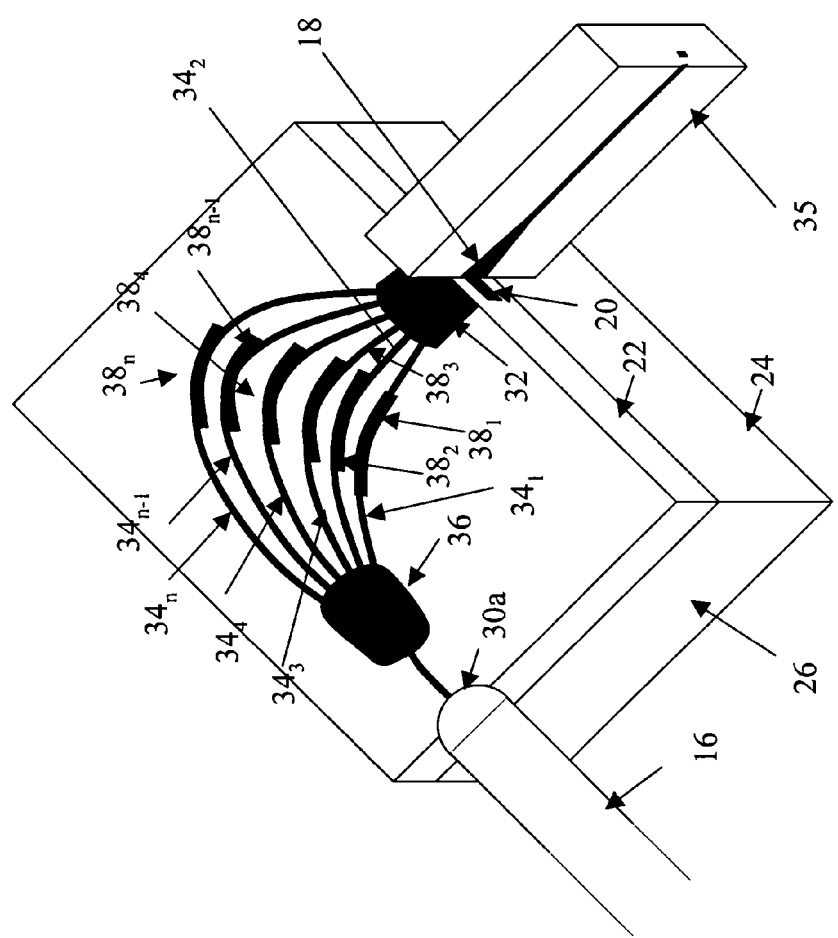
FIG. 3 is a pictorial representation of a tunable laser in accordance with another embodiment of the present invention.

In an alternative embodiment, the method and apparatus of the present invention may be used solely to mode convert without providing wavelength tunability. Such an embodiment is shown in FIG. 3. Those components in the embodiment of FIG. 3 that are essentially the same as the corresponding components found in FIG. 1 are labeled with the same reference numerals. Such an embodiment could be used to change spot size for coupling essentially any two optical components having different spot sizes, such as a fiber 16 and a waveguide 35. In such an embodiment, the phase shifters would be unnecessary and could be omitted. However, it may nevertheless be desirable to still include the phase shifters $38_1$–$38_n$ even though no wavelength tuning will be performed for the previously purposes of precision focusing and spot aligning. Also, the physical path lengths through the various grating arms could have been made all the same length. Furthermore, in a non-tunable embodiment, it would be desirable, although not necessary, to replace facet 30 of the FIG. 1 embodiment with a non-reflective reflective facet 30a. Also, in such a case, SOA 12 of the FIG. 1 embodiment may be replaced with a laser 12a, such as a distributed-feedback laser.

Alternately, one can employ the wavelength tuning features of the invention without employing the mode conversion features of the invention. Furthermore, in such a case, the SOA, star couplers and grating arms may be constructed entirely in semiconductor, if desired. In such a case, mode conversion would not be an issue since all of the components would be fabricated of the same material and, thus, have the same refractive index.

In such embodiments, the two star couplers should have the same or similar numerical apertures, whether fabricated in semiconductor or silica. For instance, if, instead of being coupled to fiber 16, the left side of waveguide device 24 were coupled to another semiconductor optical device, then the two star couplers 32 and 36 should both be high numerical aperture star couplers, preferably having the exact same numerical apertures.

Figure 4:
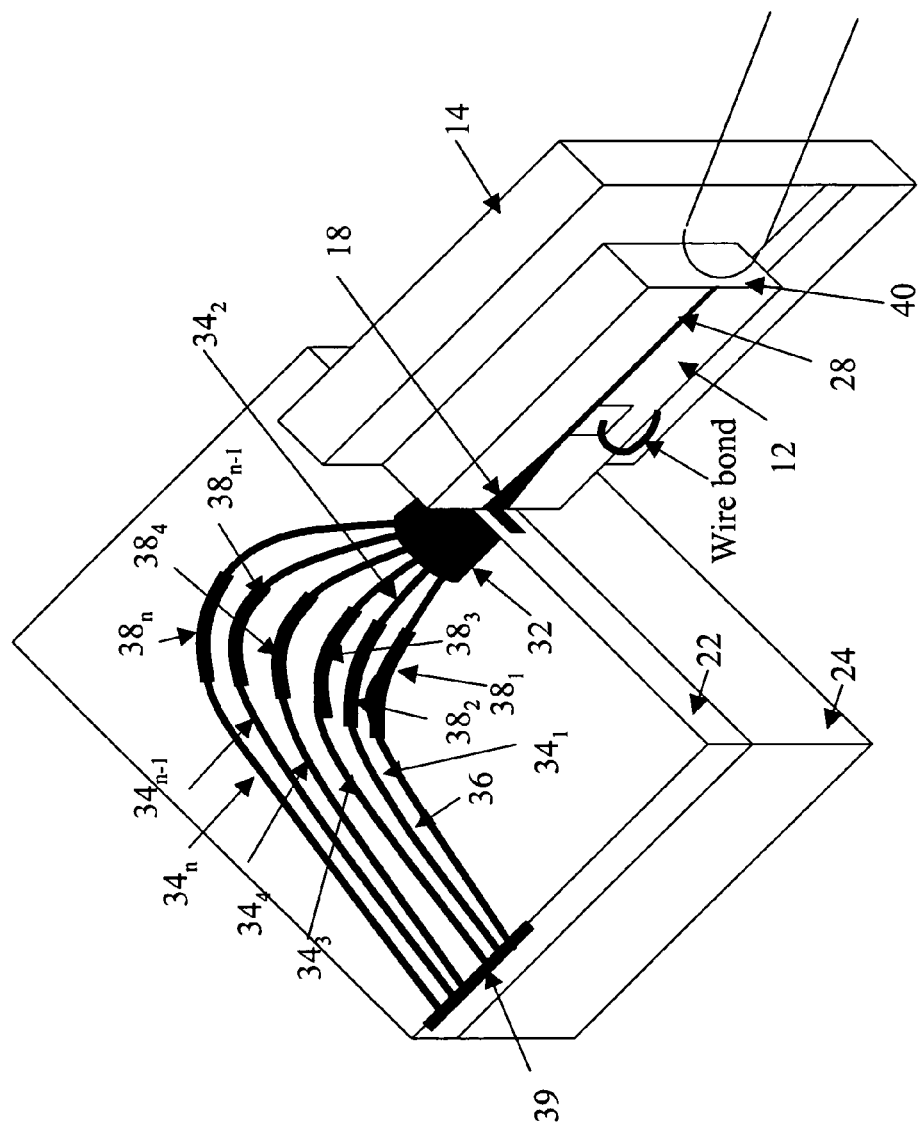
FIG. 4 is a pictorial representation of a tunable laser in accordance with another embodiment of the present invention.

As an even further alternative in the form of a wavelength tuner and/or an amplifier without mode conversion, the second star coupler 36 could be entirely eliminated and the waveguides instead terminated at highly reflective facets. FIG. 4 shows such an embodiment. In this embodiment, SOA 12 may remain essentially the same. In the waveguide structure 24, star coupler 32, waveguides 34, phase shifters 38, and facet 20 also may remain essentially the same. However, the waveguides 34, instead of being terminated at a second star coupler, are all terminated at a highly reflective facet 39. The light is amplified and tuned essentially as described above in connection with the embodiment of FIGS. 1 and 2. However, instead of mode converted light exiting out of the far end of the waveguide structure, all of the light is reflected back to the SOA. In this embodiment, the facet at the back side of SOA 12 is replaced with a partially reflective facet 40 and an output fiber 41 is coupled to the back facet 40 of the SOA.

We have constructed an actual prototype for observation and testing purposes. A description of that prototype follows.

To simultaneously meet the requirement of (a) a small number of phase shifters (for low power consumption and easier packaging), (b) a narrow passband (for single-mode operation), and (c) a large tuning range, the WGR has a very small free-spectral range and is chirped. The chirp defocuses all grating orders but one. The grating-arm length distribution is:

$$L(m) = \text{round}\left\{\left[m + \gamma\left(m - \frac{M+1}{2}\right)^2\right]A\right\}\lambda_c$$

where M is the number of waveguide grating arms, A is the starting grating order, $\lambda$ is the chirp parameter, and $\lambda_c$ is the zero-phase-shifter-power wavelength.

Actually, when the grating order is very high (~1000), as in the present case, the chirp peak itself has an approximate free spectral range of $1/(2\gamma)$ times the WGR equivalent unchirped free-spectral range. This chirp free-spectral range must be larger than the SOA gain bandwidth in order to assure single-mode laser oscillation, thus placing an upper bound on $\gamma$.

The WGR can tune the wavelength from grating order to grating order by applying a parabolic phase shift distribution via the phase shifters, and can tune the wavelength within each grating order by applying a linear plus parabolic distribution. The phase shifter setting $\phi$ in arm m to focus grating order q (any integer) and channel p (any number between −1 and 1) around that grating order on the output waveguide is $$\phi(m) = \frac{2\pi\lambda_c}{\lambda_g}\left[pm + (p+q)\gamma\left(m - \frac{M+1}{2}\right)^2\right] \mod 2\pi$$

The modulo is used to mitigate the power consumption by making sure all the applied phase shifts are less than $2\pi$.

Finally, an additional advantage of using silica for the passive part of the laser cavity is avoidance of the power limitations in passive InP caused by two-photon absorption. Thus, this laser has the potential for very high output power.

For the SOA, for convenience, we used the same structure as commonly used for making a monolithically integrated MFL. It consists of four compressively strained buried quantum wells sitting on a 0.46 µm-thick graded bandgap quaternary slab. The two SOA facets are cleaved. One is coated with TiO2 as the anti-reflection (AR) coating and the other is uncoated. The optical channel is ~900 µm long.

For the silica PLC, we used 0.65% index step phosphorous-doped LP-CVD buried silica 6 µm-thick cores. One may use higher index step waveguides in order to shorten the cavity length and better mode match the horizontal mode of the SOA. The WGR has ten grating arms, $\lambda_c$=1.555 µm, the unchirped free-spectral range is 200 GHz (A=948 at Ic), and the chirp parameter is 0.0296 (thus the chirp "free-spectral range" is ~27 nm). The output waveguide has a phase shifter for adjusting the cavity length and bends 8° before reaching the facet. We polished the output facet and deposited a single quarter-wave layer of Si. Since the output is glued directly to a fiber, this results in 43% reflectivity. For the facet glued to the SOA, we cut it at an 8°-angle, top-to-bottom, and did not polish it. The capture angle of the high-NA star couplers was about 41°. There is a 3-mm long heater on the center of each grating arm, serving as the phase shifter. Because the grating has such a high order, the distance between grating arms in the center is approximately 520 mm, and thus there is negligible inter-phase-shifter thermal crosstalk.

To assemble the laser, first the fiber was glued to the silica chip output waveguide. Then the silica chip was glued to a copper block, which was glued to a thermo-electric (TE) cooler, and all eleven phase shifters, ten on the grating arms and one on the output waveguide) were attached via wire bonds to an electrical connector. The SOA was soldered to a submount, which was soldered to a small copper block. The SOA was wire-bonded to the submount, and wires were attached to the submount. The SOA assembly was rotated 90°, swung upwards 8°, and glued to the silica chip using active alignment.

The SOA has gain for only transverse-electrically (TE)-polarized light. Thus the laser light in the silica chip is transverse-magnetically (TM) polarized. This is advantageous because SOAs usually are more efficient for TE-polarized light, while silica thermo-optic phase shifters usually are more efficient for TM-polarized light.

The laser oscillation threshold at 20° C. is approximately 50 mA. The thermo-optic phase shifter efficiency is 2p/(750 mW). Thus the total phase shifter power consumption can be as much as 4 W. The TE cooler could not hold the 20° C. temperature used in the following measurements at such a power dissipation level, and so we had to cool the TE-cooler heat sink to take the measurements reported below. Etching trenches around the phase shifters potentially would reduce the total chip power consumption to less than 0.5 W.

Figure 5:
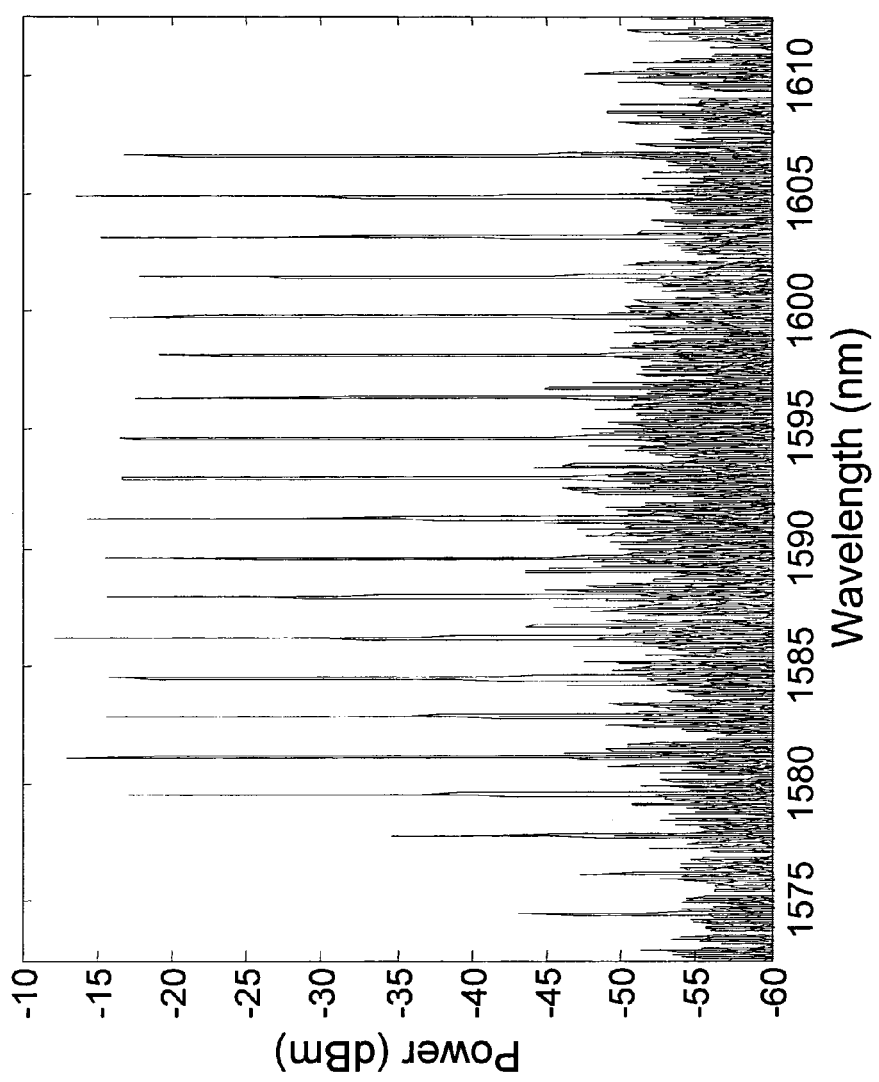
FIG. 5 is a graph illustrating optical power as a function of wavelength for seventeen different values of q, i.e., for seventeen different grating orders, by applying parabolic phase shift distributions to the grating arms of various strengths in a tunable laser in accordance with the present invention
Figure 6:
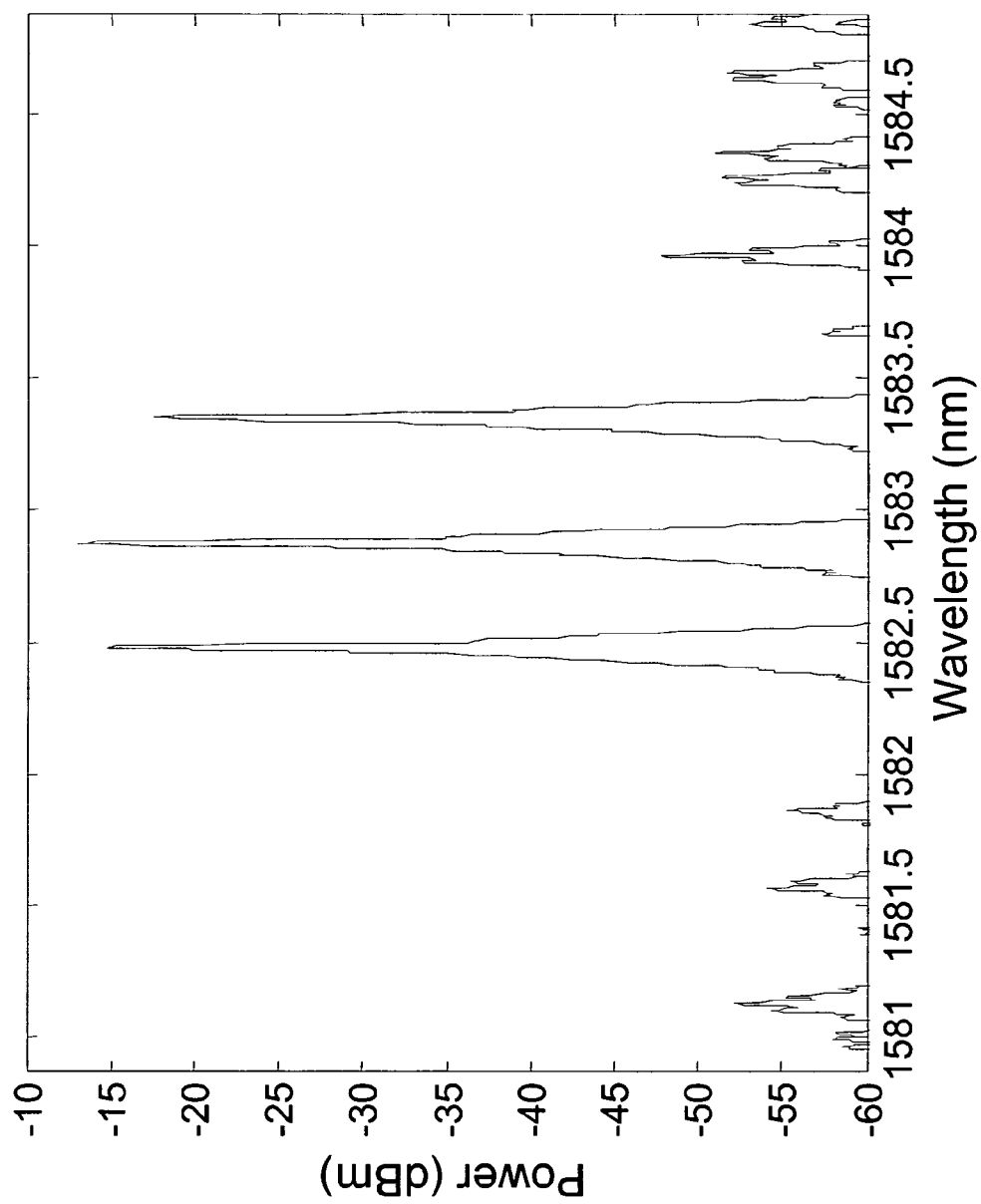
FIG. 6 is a graph illustrating optical power as a function of wavelength for three different values of p for q=1, i.e., for different wavelengths within a grating order, by applying linear phase shift distributions of three different strengths across the grating arms.

FIG. 5 shows measured spectra of the laser output for various values of q applied to the phase shifters. The laser tuning range is approximately 25 nm. The SOA gain peak is approximately 35 nm higher than Ic, so the laser wavelengths are concentrated around the next higher chirp order, which is slightly more lossy. The SOA AR coating is imperfect (reflectivity ~2%), and thus one can see ripple with a period of 0.28 nm and peak-to-peak amplitude of about 5 dB (when the laser is oscillating) in the spontaneous emission spectrum. This causes laser instability and multimode oscillation, depending on the position of the reflection-induced ripple. The cavity mode spacing is approximately 3 GHz. The SOA current was approximately 100 mA for all measurements. The output power in the fiber was typically 50 mW. The side mode suppression ratio, when the SOA facet is not causing multimode oscillation, is greater than 30 dB. FIG. 6 shows the result of holding q constant but changing p, showing that the laser wavelength can be tuned within about one grating order.

We did not measure the tuning speed, but based on the known speed of silica thermo-optic phase shifters, we expect it to be about 2 ms. Also, we did not measure the direct modulation speed, but it may be possible to achieve 2.5 Gb/s with this laser using electronic precompensation.

We have demonstrated a laser with a tuning range of about 25 nm based on direct attachment of a low-cost SOA and a lost-cost silica chip with no precise alignments. Alterations to the above-described design that will likely improve performance include: 1) eliminating the SOA/glue reflection by angling the SOA waveguide; 2) using an SOA purely optimized for high saturation output power and good high temperature performance; 3) using trenched thermo-optic phase shifters to reduce their power consumption; and 4) using higher delta silica waveguides to increase the cavity mode spacing and facilitate the vertical mode matching to the SOA lateral mode.

This present invention could be integrated with other functions in the silica waveguide chip.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A spot size converter for coupling an optical signal between optical devices having different spot sizes comprising:
   a first star coupler having a first numerical aperture adapted to receive an optical signal from a first optical device having a first spot size;
   a second star coupler having a second numerical aperture different than the first numerical aperture; and
   a plurality of connecting waveguides between the first star coupler and the second star coupler;
   wherein the numerical apertures of the first and second star couplers are selected relative to each other to provide conversion of optical signals from the first spot size of the first device to a predetermined second spot size of the second device different than the first spot size.

2. The spot size converter of claim 1 further comprising a phase shifter apparatus operatively coupled to the plurality of waveguides.

3. The spot size converter of claim 2 wherein the phase shifter apparatus is adapted to provide phase shifting of optical signals passing through the converter to compensate for any focus error between the first star coupler and the first optical device.

4. The spot size converter of claim 2 wherein the phase shifter apparatus is adapted to provide phase shifting of optical signals passing through the converter to compensate for any lateral offset of the first star coupler relative to the first optical device.

5. The spot size converter of claim 1 wherein the plurality of waveguides are each of a different length.

6. The spot size converter of claim 5 wherein the waveguides differ in length from each other by integer multiples of a wavelength of the optical signal.

7. The spot size converter of claim 1 further comprising a heat sink upon which the planar waveguide is mounted.

8. A tunable laser comprising:
   a semiconductor optical amplifier having an output port from which an optical signal having a first spot size is issued; and
   a spot size converter coupled to the semiconductor optical amplifier including;
   a first star coupler having a first numerical aperture coupled to receive the optical signal having the first spot size from the semiconductor optical amplifier; and
   a second star coupler operatively coupled to the first star coupler and having a second numerical aperture different than the first numerical aperture;
   wherein the first and second numerical apertures of the first and second star couplers, respectively, are selected relative to each other to provide conversion of optical signals from the first spot size of the semiconductor optical amplifier to a predetermined second spot size of a second optical device different than the first spot size.

9. The laser of claim 8 wherein the spot size converter is formed in a planar waveguide layer and the semiconductor optical amplifier and the planar waveguide layer are oriented orthogonal to each other.

10. The laser of claim 8 wherein the spot size converter further comprises a plurality of waveguides coupling the first star coupler to the second star coupler.

11. The laser of claim 8 further comprising a phase shifter apparatus coupled to the plurality of waveguides, whereby the laser is wavelength tunable by altering the effective path lengths through the waveguides relative to each other with the phase shifters.

12. The laser of claim 11 wherein the phase shifter apparatus is adapted to provide phase shifting of optical signals passing through the converter to compensate for any focus error at an interface between the semiconductor optical amplifier and the first star coupler.

13. The laser of claim 11 wherein the phase shifter apparatus is adapted to provide phase shifting of optical signals passing through the converter to compensate for any lateral offset of the first star coupler relative to the first optical device.

14. The laser of claim 11 wherein the semiconductor optical amplifier comprises a lasing cavity that is tapered so as to widen adjacent the output such that the cavity at the output port has a horizontal size matched to the vertical size of the waveguide layer of the spot size converter.

15. The laser of claim 14 wherein a lasing cavity of the laser comprises the spot size converter and the semiconductor optical amplifier.

16. The laser of claim 11 wherein the plurality of waveguides are each of a different length.

17. The laser of claim 16 wherein the waveguides differ in length from each other by integer multiples of a wavelength of the optical signal.

18. A method of coupling the optical signal between a first optical element having a first spot size and a second optical element having a second spot size different than the first spot size, the method comprising the steps of:

propagating an optical signal having a first spot size from the first optical element through a first star coupler having a first numerical aperture; and propagating the optical signal from the first star coupler into a second star coupler having a second numerical aperture different than the first numerical aperture;

wherein the first and second numerical apertures are selected relative to each other such that the first spot size of the optical signal from the first optical device is converted to a second predetermined spot size for propagation into the second optical element.

19. The method of claim 18 wherein the step of propagating the optical signal from the first star coupler into the second star coupler comprises propagating the optical signal through a plurality of optical paths between the first and second star couplers.

20. The method of claim 19 further comprising the step of:
altering effective optical path lengths of each of the plurality of optical paths so as to set up phase interference between light in each of the optical paths so as to wavelength tune the optical signal.

21. The method of claim 20 wherein the step of altering effective optical path lengths comprises setting up the effective optical path lengths to cause the plurality of waveguides to have linearly varying phase shift distribution relative to each other so as to provide wavelength tunability within a single free spectral range.

22. The method of claim 20 wherein the step of altering effective optical path lengths comprises setting up the effective optical path lengths to cause the plurality of waveguides to have parabolically varying phase shift distribution relative to each other so as to provide wavelength tunability over a plurality of free spectral ranges.

23. The method of claim 20 wherein the altering step comprises altering effective optical path lengths of each of the plurality of optical paths so as to provide phase shifting of optical signals in the plurality of optical paths to compensate for any focus error at an interface between the first star coupler and the first optical element.

24. The method of claim 20 wherein the altering step comprises altering effective optical path lengths of each of the plurality of optical paths so as to provide phase shifting of optical signals in the plurality of optical paths to compensate for any lateral offset of the first optical device relative to the first star coupler.

25. A method of converting the spot size of a light beam, the method comprising the steps of:
1) coupling the light beam into a first star coupler having a first numerical aperture;
2) coupling the light beam between the first star coupler and a second star coupler having a second numerical aperture different than the first numerical aperture; and
3) coupling the light beam out of the second star coupler.

26. The method of claim 25 wherein step (2) comprises coupling the light beam between the first and second star couplers through a plurality of optical paths and further comprising the step of:
4) altering effective optical lengths of each of the plurality of optical paths so as to set up phase interference between light in each of the plurality of waveguides so as to wavelength tune the light beam.

27. The method of claim 26 wherein step (4) comprises setting up the effective optical path lengths to cause the plurality of optical paths to have linearly varying phase shift distribution relative to each other so as to provide wavelength tunability within a single free spectral range.

28. The method of claim 26 wherein step (4) comprises setting up the effective optical path lengths to cause the plurality of waveguides to have parabolically varying phase shift distribution relative to each other so as to provide wavelength tunability over a plurality of free spectral ranges.

29. An apparatus for converting the mode of a light beam comprising:
1) means having a first numerical aperture at a terminal thereof for receiving the light beam;
2) means having a second numerical aperture at a terminal thereof for outputting the light beam; and
3) means for coupling the light beam between the means for receiving and the means for outputting.

30. The apparatus of claim 29 wherein the means for coupling comprises a plurality of optical paths, the apparatus further comprising:
4) means for altering effective optical lengths of each of the plurality of optical paths.

* * * * *